United States Patent [19]
Krenzler

[11] Patent Number: 5,337,512
[45] Date of Patent: Aug. 16, 1994

[54] MOUSE TRAP

[76] Inventor: Leo M. Krenzler, 1142 Industry Dr., Seattle, Wash. 98188

[21] Appl. No.: 39,934

[22] Filed: Mar. 29, 1993

[51] Int. Cl.⁵ .................................. A01M 23/26
[52] U.S. Cl. .................................. 43/82; 43/81; 43/83
[58] Field of Search ............... 43/81, 81.5, 82, 83

[56] References Cited

U.S. PATENT DOCUMENTS

| | | | |
|---|---|---|---|
| 192,980 | 7/1877 | Earle | 43/81 |
| 1,140,542 | 5/1915 | Sprague | 43/83 |
| 1,517,210 | 11/1924 | Gomber | 43/83 |
| 1,690,369 | 11/1928 | Harte | 43/81 |
| 2,068,492 | 1/1937 | Johnson | 43/83 |
| 2,068,865 | 1/1937 | Nauhausen | 43/83 |
| 2,209,522 | 7/1941 | Houtsinger et al. | 43/83 |
| 2,258,549 | 10/1941 | Drake | 43/83 |
| 2,526,199 | 10/1950 | Colling | 43/82 |
| 2,637,931 | 5/1953 | Sklar | 43/83 |
| 2,702,443 | 2/1955 | Bruske | 43/81 |
| 4,665,644 | 5/1987 | Vajs et al. | 43/82 |
| 4,703,583 | 11/1987 | Dzurkovich et al. | 43/82 |
| 4,803,799 | 2/1989 | Vajs et al. | 43/82 |
| 4,825,579 | 5/1989 | Dzurkovich et al. | 43/82 |
| 4,858,373 | 8/1989 | Combs | 43/61 |
| 4,991,340 | 2/1991 | Schildt | 43/81 |

FOREIGN PATENT DOCUMENTS 800395  7/1936  France .................. 43/83

Primary Examiner—Kurt C. Rowan
Attorney, Agent, or Firm—Delbert J. Barnard; Glenn D. Bellamy; Teresa J. Wiant

[57] ABSTRACT

An inexpensive rodent trap (10) is provided which may be set and emptied without a user contacting the trap (10) near a striker portion (36) of the trap (10). The trap (10) is effective for trapping a rodent (8) without bait since the trap (10) is configured such that the rodent (8) will enter the trap (10) as the rodent (8) moves along a floor (26) near a wall (14).

8 Claims, 3 Drawing Sheets

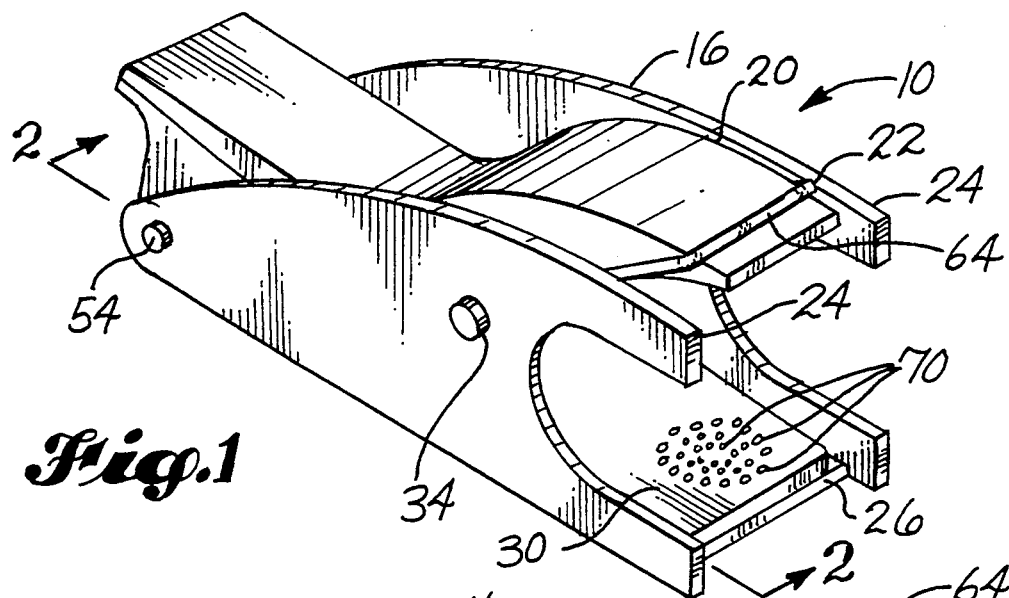
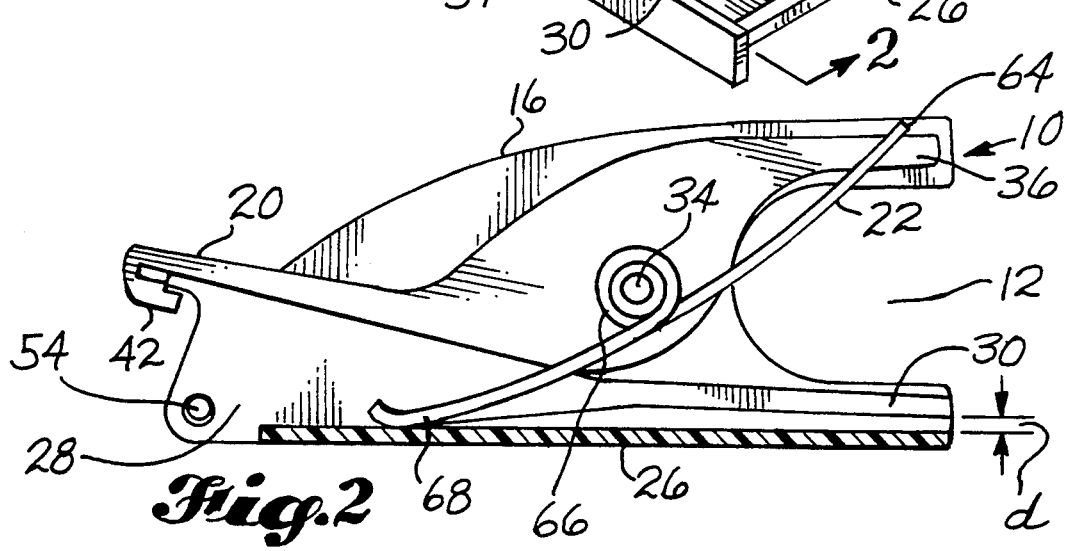
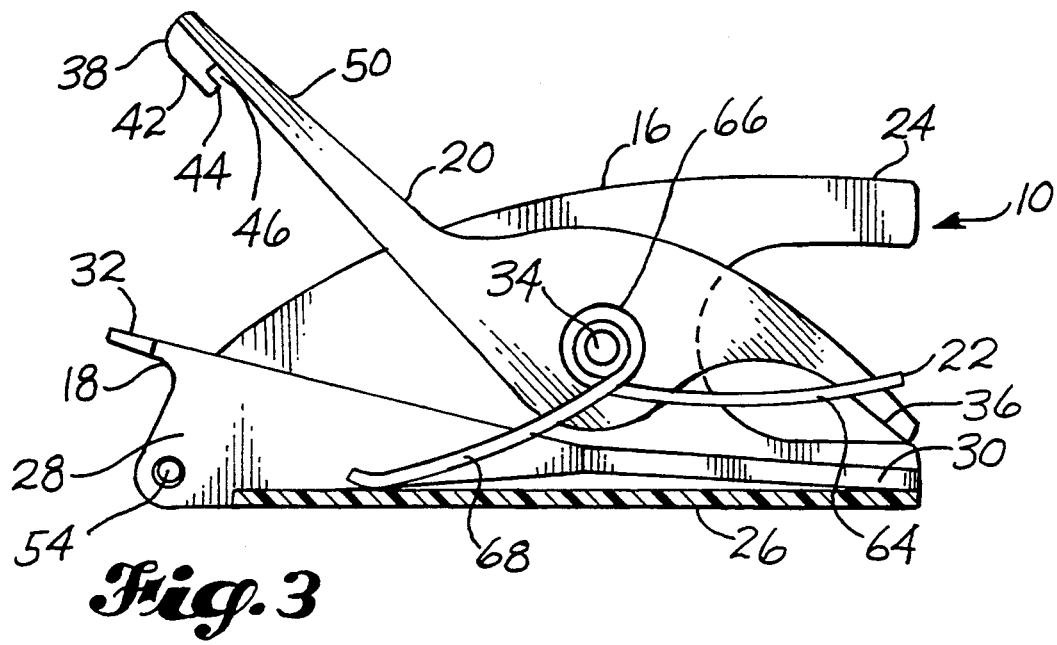

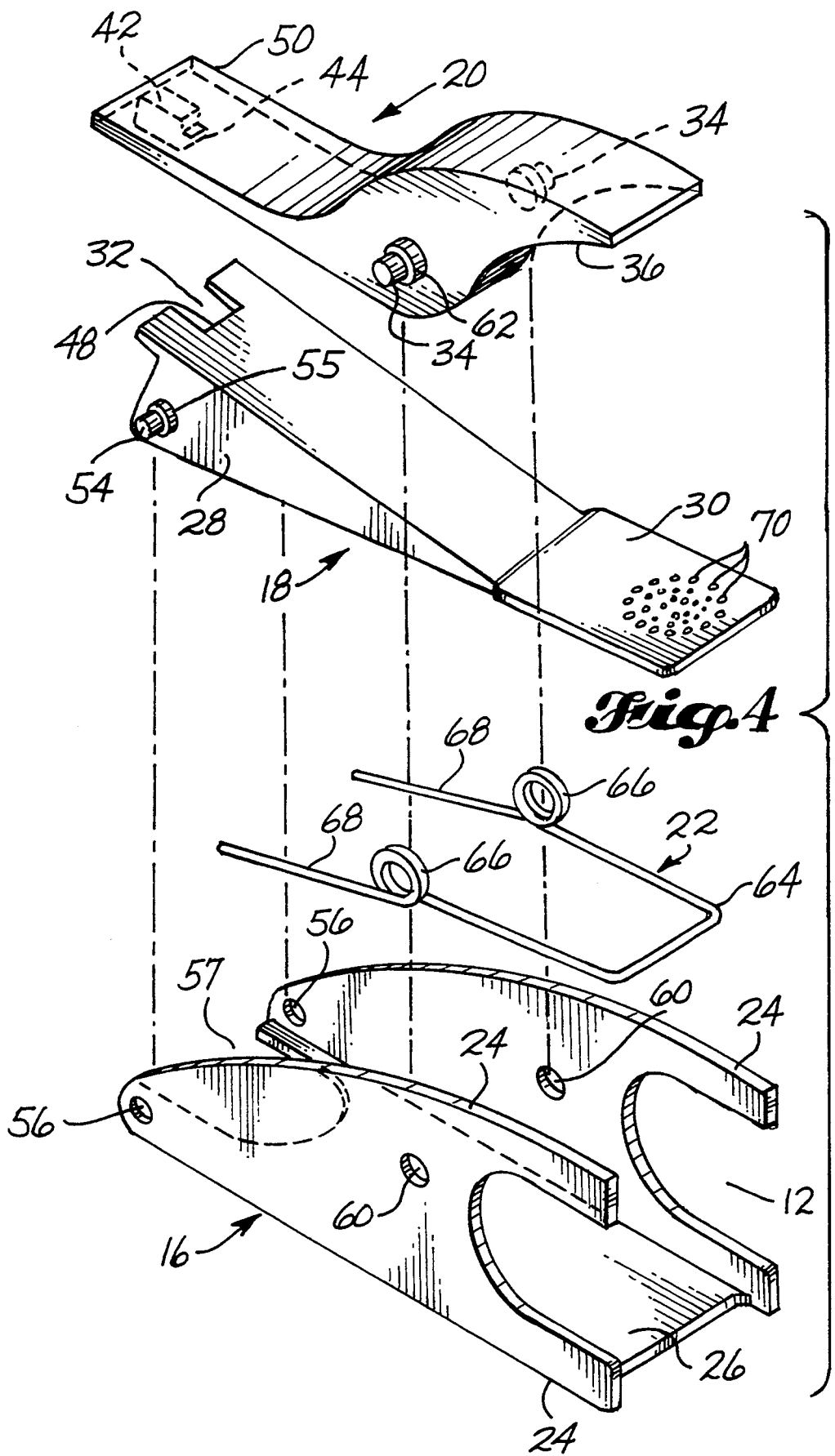

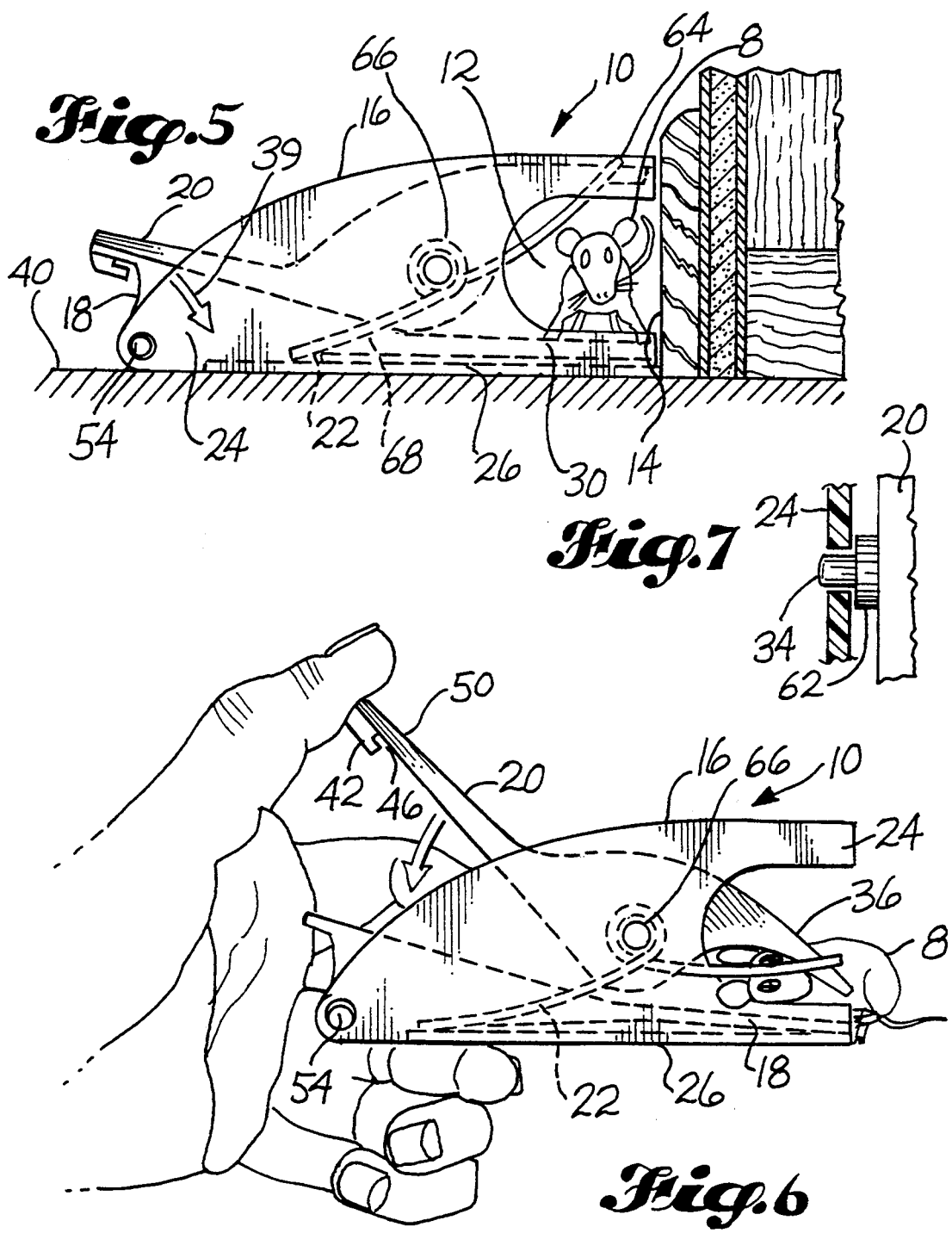

MOUSE TRAP

DESCRIPTION

1. Technical Field

This invention relates to a trap for rodents, especially mice and rats, operable for trapping a rodent by a striking force, and more particularly, to a trap operable for trapping a rodent as it moves along a floor adjacent a wall and to a trap which allows setting and releasing with only one hand.

2. Background Information

A wide variety of rodent traps are well known. Traps which strike and kill a rodent have two main drawbacks. First, because such traps usually require that a user's fingers be used to manipulate a trigger or the like which is within the strike zone, these traps can be difficult or dangerous to set. A second problem is that it can be difficult to dispose of a killed rodent from such traps in a sanitary or aesthetically tolerable manner. As a result, the user is often tempted simply to discard the entire trap along with the killed rodent. This, of course, is expensive and wasteful.

It is also well known that a rodent's natural instinct is to walk across a floor close to the edge of a wall and to run through holes or openings. Rodent traps have been disclosed in Dzurkovich et al. (U.S. Pat. No. 4,703,583) and Colling (U.S. Pat. No. 2,526,199) which take advantage of a rodent's tendency to walk along the edge of a wall. These patents should be carefully studied for the purpose of putting the present invention into context. The Dzurkovich et al. patent discloses a baitless rodent trap with a disposable, removable cartridge and sleeve. The sleeve is stretched along the cartridge to form a tunnel. The cartridge and sleeve are placed on a trap such that when the rodent walks into the tunnel, the trap is tripped and the rodent is trapped inside the sleeve. Then, the sleeve or the sleeve and the cartridge containing the killed rodent may be disposed of.

The Colling patent discloses a trap which has animal receiving openings. The trap is formed of two separate sheet metal portions. One of the sheet metal portions includes a springy slotted clamp jaw which is united with a floor and is properly curved to extend upward and downward and over and above the floor and to exert spring pressure toward the floor. In assembly of the trap, the clamp jaw is held in an upwardly position by a springy portion. When an animal enters an animal receiving opening and contacts a pedal of the trap, the pedal is forced both downward and leftward resulting in a sufficient movement to release the clamped jaw and permit the clamped jaw to be snapped down by its own springy action, thereby to grip or clamp the animal.

It is an object of the present invention to improve upon such traps, providing one which is both easy to set and empty, as well as one which takes advantage of a rodent's natural instinct to run along the edge of a wall and through holes or openings.

DISCLOSURE OF THE INVENTION

The present invention provides a rodent trap which comprises a frame, a pedal, a hammer, and a spring. The frame is configured such that when it is positioned adjacent a vertical surface, a passageway is defined. The pedal is pivotally mounted on the frame. The pedal includes a latching portion and presents a landing in the passageway. The pedal is pivotally movable between a set position and a tripped position relative to the frame. The hammer is pivotally mounted on the frame. The hammer includes a striker portion and a latching portion. The striker portion is positioned to be movable toward the landing. The spring biases the striker portion toward the landing. The hammer latching portion and the pedal latching portion are configured for positioning the striker portion away from the landing when the pedal is in a set position. The striker portion is released for movement toward the landing when the pedal is in the tripped position. In use, the trap is set by positioning the hammer latching portion and the pedal latching portion such that the landing is in a set position and the striker portion is positioned away from the landing. The trap is tripped by a rodent stepping on the landing in the passageway and pivoting the landing into the tripped position. Then, the striker portion is pivoted toward the landing and into contact with the rodent.

The rodent may be released from the trap by pivoting the hammer such that the striker portion is away from the rodent. The landing may further include dimples configured for holding a rodent attracting substance.

In one form of the invention, the hammer includes a handle portion and the pedal includes a handle portion. The hammer handle portion and the pedal handle portion are positioned relative to each other such that a user may grasp with one hand the hammer handle portion and the pedal handle portion and pivot the hammer and the pedal to position the trap into a set position. In a like manner, the user may grasp with one hand the hammer handle portion and the pedal handle portion such that a rodent trapped in the trap is released from the trap.

In another form of the invention, the frame includes opposite, substantially parallel sidewalls. The sidewalls are configured such that when the frame is positioned adjacent a vertical surface, the passageway is defined between the sidewalls and the vertical surface.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of a rodent trap according to the present invention;

FIG. 2 is a side sectional view of the trap taken substantially along line 2—2 of FIG. 1;

FIG. 3 is a side sectional view of the trap shown in FIG. 2, but in a tripped position;

FIG. 4 is an exploded pictorial view of the rodent trap of the present invention;

FIG. 5 is the rodent trap in a set position with a rodent entering a passageway between the trap and a wall;

FIG. 6 is a side elevational view of a user grasping the rodent trap which has been tripped and has trapped a rodent; and FIG. 7 is a fragmentary view in the region of a hammer trunnion.

BEST MODE FOR CARRYING OUT THE INVENTION

The present invention provides a simplistic rodent trap which is inexpensive to manufacture and assemble. The trap may be easily set without a user risking tripping the trap and catching his fingers in the trap. The trap may even be used effectively without bait. In addition, the trap provides an easy release mechanism whereby a user may release a rodent from the trap without touching it.

It has been noted that as a rodent 8 moves about a space, such as the inside of a building, the rodent 8 is likely to move across the floor near the edge of a vertical surface, such as a wall. The rodent trap 10 of the present invention relies in part upon a rodent's tendency to move near a vertical surface by providing a trap 10 which forms a passageway 12 between a vertical surface 14 and the trap 10 such that the rodent 8 is likely, or even enticed, to enter the passageway 12.

As illustrated in FIGS. 1–4, the preferred embodiment of the trap 10 includes four basic parts: a frame 16, a pedal 18, a hammer 20, and a spring 22. The frame 16 has substantially horizontal sidewalls 24 extending upwardly from a floor 26. The sidewalls 24 are configured to form a passageway 12 when placed adjacent a vertical surface 14. The passageway 12 is sized for receiving a rodent 8, as illustrated in FIG. 5. The pedal 18 and the hammer 20 are pivotally mountable on the frame 16.

The pedal 18 includes mounting portions 28, a landing 30, and a latching portion 32. The pedal 18 is mounted on the frame 16 by the mounting portions 28 such that the pedal 18 is pivotable between a set position (FIG. 2) and a tripped position (FIG. 3) relative to the frame 16. When a rodent 8 enters into the passageway 12 and steps on the landing 30, the pedal 18 pivots into a tripped position relative to the frame 16.

The hammer 20 has mounting trunnions 34, a striker portion 36, and a latching portion 38. The hammer trunnions 34 mount the hammer 20 on the frame 16 such that the striker portion 36 is pivotable toward and away from the landing 30 of the pedal 18. The striker portion 36 is configured for striking and trapping a rodent 8 on the landing 30 when the trap 10 is tripped.

The hammer latching portion 38 and the pedal latching portion 32 are configured for holding the hammer striker portion 36 away from the landing 30 in a set position. When the landing 30 is in a tripped position, the hammer striker portion 36 is pivoted toward the landing 30. The spring 22 is positioned on the trap 10 for biasing the striker portion 36 of the hammer 20 toward the landing 30 of the pedal 18.

In use, the hammer 20 and the pedal 18 are pivotally mounted on the frame 16 with the spring 22 biasing the striker portion 36 of the hammer toward the landing 30 of the pedal. The trap 10 is set by positioning the hammer latching portion 38 and the pedal latching portion 32 together such that the striker portion 36 of the hammer 20 is away from the landing 30 and the pedal 18 is in a set position, and spaced a distance d from floor 26, as illustrated in FIG. 2. This can be accomplished using only one hand and without placing any body parts in the passageway 12 or at risk of being injured.

Referring to FIG. 5, the trap 10 may be positioned adjacent a vertical surface 14, such that a passageway 12 is defined between the trap 10 and the vertical surface 14. As a rodent 8 moves across a floor or other horizontal surface 40 adjacent the vertical surface 14, the rodent 8 is enticed to pass through the passageway 12 and steps on the landing 30. The weight of the rodent 8 stepping on the landing 30 pivots the landing 30 as shown in FIG. 5 by arrow 39 such that the pedal 18 is moved into a tripped position and the hammer latching portion 38 is released from the pedal latching portion 32. As a result, the striker portion 36 is forcefully moved toward the landing 30 due to the spring energy in the spring 22 biasing the striker portion 36 toward the landing 30, as illustrated in FIG. 3. As the striker portion 36 moves toward the landing 30, the rodent 8 is trapped on the landing 30 by the striker portion 36, as illustrated in FIG. 6.

Referring to FIG. 6, it can be seen that the trapped rodent 8 can be conveniently and sanitarily released from the trap 10 and disposed of without ever touching the rodent 8. The user simply grasps a handle portion 50 of the hammer and the base 16 to move the striker portion 36 of the hammer 20 away from the rodent 8. Then, the trap 10 may be emptied by tilting the trap 10 such that the rodent 8 falls from the trap 10 into a suitable receptacle. In a like manner, this preferred form of the invention allows a user to set the trap 10 with one hand by a similar movement. The user simply moves the handle portion 50 of the hammer until the latching portion 38 and the pedal latching portion 32 are in engagement. This engagement concurrently causes the landing portion 30 of the pedal 18 to be lifted into a set position.

FIG. 4 illustrates a preferred form of the parts of the rodent trap 10. The hammer can be manufactured from a single injection molded piece and comprises an elongated member having a striker portion 36 at one end and a latching portion 38 at the other end. The pedal 18 also can be manufactured by injection molding and comprises an elongated member having a landing 30 at one end and a latching portion 32 at the other end. As illustrated in FIG. 4, the hammer latching portion 38 includes a projecting member 42 which includes a lip 44. The lip 44 and the hammer 20 form a mouth 46. The pedal latching portion 32 comprises a notch 48. The notch 48 is configured to be positioned in the mouth 46 of the hammer 20 when the trap 10 is in the set position. When a rodent 8 trips the trap 10 by stepping on the landing 30, the pedal 18 is pivoted such that the notch 48 is moved out of the mouth 46 and out of engagement with the lip 44 such that the striker portion 36 is moved forcefully toward the landing 30 due to spring energy in the spring 22.

The hammer 20 and the pedal 18 are mounted on the frame 16 for pivotal movement. The pedal 18 may be mounted for pivotal movement by any known means, but in a preferred form of the invention, the pedal 18 is mounted on the frame 16 by trunnions 54 which fit into sidewall openings 56. Trunnions 54 each include an enlarged diameter base 55 and a radial shoulder where the base 55 meets the trunnion end part. The hammer 20 also includes shoulder forming bases 62 which are coaxial with the hammer trunnions 58. The shoulder bases 62 space the hammer 20 away from the sidewalls 24 of the frame 16 such that the hammer 20 is freely pivotable. The freely-pivoting movement of the hammer 20 is advantageous when the trap 10 is tripped for permitting the hammer 20 to be moved toward the landing 30 without significant friction interference.

The shoulder bases 62 also accommodate helical portions 66 of the spring 22. A loop portion 64 extends over the striking portion 36 of the hammer 20 and connects the helical portions 66. Leg portions 68 extend from each helical portion 66 opposite the loop portion 64. When the spring 22 is in a non-stressed position, the loop portions 64 and the leg portions 68 are substantially within the same plane, as illustrated in FIG. 4. The loop portion 64 is sized for fitting over the striker portion 36 to bias the striker portion 36 of the hammer 20 toward the landing 30 of the pedal 18.

When the trap 10 is assembled, the spring 22 is placed into a stressed position with the helical portions 66 placed around the shoulder bases 62 of the hammer 20. The loop portion 64 is placed over the hammer 20, toward the striker portion 36. This results in the leg portions 68 extending downwardly to contact the floor 26 of the frame 16, as illustrated in FIG. 5. Once the trap 10 is assembled, the spring 22 biases the striker portion 36 toward the landing 30 due to the spring 22 being in a stressed position, as illustrated in FIG. 3. The stress of the spring 22 biasing the striker portion 36 toward the landing 30 holds a rodent 8 in a trapped position, as illustrated in FIG. 6.

When the trap 10 is set, the hammer striker portion 36 is pivoted away from the landing 30 with the spring 22 bent into a more stressed position such that the spring 22 stores spring energy. When the trap 10 is tripped, the hammer 20 is free to pivot toward the landing 30, and the stored energy in the spring 22 forcefully pulls the striker portion 36 toward the landing 30. The floor 26 of the frame 16 provides a support for the leg portions 68 of the spring 22 to bear against when the rodent trap 10 is assembled. In a preferred form of the invention, the floor 26 extends substantially the full length of the frame 16, as illustrated in FIG. 4.

The present invention allows the trap 10 to be manufactured and assembled at minimal cost. The four parts of the trap can be assembled simply by placing the spring 22 in position on the hammer 20 with the helical portion 66 in place over the shoulders 62 and the loop portion 64 in place over the striking portion 36. The pedal 18 is then snapped in place on the frame 16 by flexing apart the rear corners of walls 24 to insert the trunnions 54 into the openings 56. The hammer 20 and spring 22 are then assembled onto the frame 16 by flexing apart the sidewalls 24 for insertion of the trunnions 34 into the openings 60. This completes the installation and allows the trap 10 to be ready for immediate use.

If desired, the pedal 18 may include dimples 70 formed on the landing 30. The dimples 70 are sized for receiving a rodent attracting substance or bait, such as an oil, or food. The dimples 70 increase the surface area or friction-between the landing 30 and the rodent attracting substance such that the rodent attracting substance is held on the landing 30 unless a force is applied to it.

The present invention provides an economical, effective, and easy to use rodent trap 10. The frame 16, pedal 18, and the hammer 20 of the present invention may be formed from inexpensive, injection molded plastic. The spring 22 may be formed from spring wire. The parts of the trap 10 may be easily assembled, resulting in very low assembly costs.

Although the preferred embodiments of the invention have been illustrated and described herein, it is to be understood by those skilled in the art that various modifications and omissions in form and detail may be made without departing from the spirit and scope of the invention. Therefore, my patent protection is not to be limited by the illustrated and explained embodiments, but rather by the following claim or claims interpreted according to accepted doctrines of claim interpretation, including the doctrine of equivalents and reversal of parts.

What is claimed is:

1. A rodent trap, comprising:
   a frame having sidewalls configured to define a bottom boundary, a top boundary, and a side boundary such that when said frame is positioned adjacent a vertical surface, a passageway is defined by and between the vertical surface and the bottom boundary, top boundary and side boundary of the sidewalls with said top boundary and said bottom boundary of said sidewall extending substantially to said vertical surface;
   a pedal pivotally mounted on said frame, said pedal including a latching portion and presenting a landing in said passageway, said pedal being pivotally movable between a set position and a tripped position relative to said frame;
   a hammer pivotally mounted on said frame, said hammer including a striker portion and a latching portion, said striker portion being positioned to be movable toward said landing;
   a spring biasing said striker portion toward said landing;
   said hammer latching portion and said pedal latching portion being configured for positioning said striker portion away from said landing when said pedal is in a set position and said striker being released for movement toward said landing when said pedal is in said tripped position;
   wherein in use, said trap is set by positioning said latching portion and said pedal latching portion such that said landing is in a set position and said striker portion is positioned away from said landing, and said trap is tripped by a rodent stepping on said landing in said passageway and pivoting said landing into said tripped position, said striker portion then being pivoted toward said landing and into contact with the rodent.

2. A rodent trap according to claim 1, wherein said rodent is released from said trap by pivoting said hammer such that said striker portion is away from said rodent.

3. A rodent trap according to claim 1, wherein said landing further includes dimples configured for holding a rodent attracting substance.

4. A rodent trap according to claim 1, wherein said hammer includes a handle portion and said pedal includes a handle portion, said hammer handle portion and said pedal handle portion being positioned relative to each other such that a user may grasp with one hand the hammer handle portion and the pedal handle portion and pivot said hammer and said pedal to position the trap into a set position.

5. A rodent trap according to claim 4, wherein said hammer handle portion and said pedal handle portion are positioned relative to each other such that a user may grasp with one hand the hammer handle portion and the pedal handle portion and pivot said hammer such that said trapped rodent is released from said trap.

6. A rodent trap according to claim 1, wherein said hammer includes a handle portion and said pedal includes a handle portion, said hammer handle portion and said pedal handle portion being positioned relative to each other such that a user may grasp with one hand the hammer handle portion and the pedal handle portion and pivot said hammer such that said trapped rodent is released from said trap.

7. A rodent trap according to claim 1, wherein said sidewalls are opposite and substantially parallel.

8. A rodent trap, comprising:
   a frame having a pair of sidewalls and an end, said sidewalls being configured to provide a bottom boundary, a top boundary, and a side boundary such as to form a passageway at the end of the frame when the frame is positioned adjacent a vertical surface, said passageway being defined by and between the bottom boundary, the top boundary, and the side boundary of the sidewalls and the vertical surface with said top boundary and said bottom boundary of said sidewall extending substantially to said vertical surface;

a pedal being pivotally mounted on the frame and having a latching portion which is radially spaced from the pivotal mount and a landing portion which extends into said passageway, said pedal being movable between a set position and a tripped position relative to the frame;

a hammer mounted on the frame and pivotable between tripped and set positions, said hammer including a latching portion positioned to be engageable with the latching portion of the pedal when in the set position, a striker portion positioned to be movable substantially through said passageway and toward the landing when the hammer is in a tripped position, and a handle portion positioned to allow manipulation of the hammer without reaching into a line of travel of the striker portion and the passageway;

a spring biasing the hammer toward the tripped position when released from the set position; and movement of the hammer into the set position causing the pedal to move into the set position and the pedal latching portion to be pivoted into engagement with the hammer latching portion, and movement of the landing portion of the pedal rotating the latching portion of the pedal out of engagement with the latching portion of the hammer, thereby allowing the spring to propel the striker portion toward the pedal and through the passageway.

* * * * *